(12) United States Patent
Reel (10) Patent No.: US 6,775,028 B1
(45) Date of Patent: Aug. 10, 2004

(54) NON-LINEAR METHOD OF MAPPING THE LIGHTNESS AND CHROMA OF A DISPLAY DEVICE GAMUT ONTO A PRINTING DEVICE GAMUT

(75) Inventor: Richard Lee Reel, Georgetown, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/511,756

(22) Filed: Feb. 24, 2000

(51) Int. Cl.$^7$ .............................. G06F 15/00; G06K 1/00
(52) U.S. Cl. ...................... 358/1.9; 358/1.9; 358/3.22; 358/3.23; 358/518; 358/519; 358/520; 382/167; 382/270; 382/272; 382/285; 348/631; 348/649
(58) Field of Search .............................. 358/3.22, 3.23, 358/1.9, 518, 520, 519; 348/649, 631; 382/167, 270, 272, 285

(56) References Cited

U.S. PATENT DOCUMENTS

| | | |
|---|---|---|
| 4,670,780 A | 6/1987 | McManus et al. |
| 5,081,529 A | 1/1992 | Collette |
| 5,105,469 A | 4/1992 | MacDonald et al. |
| 5,204,948 A * | 4/1993 | Kato ........................ 358/520 |
| 5,237,517 A | 8/1993 | Harrington et al. |
| 5,243,414 A | 9/1993 | Dalrymple et al. |
| 5,309,257 A | 5/1994 | Bonino et al. |
| 5,317,426 A | 5/1994 | Hoshino |
| 5,341,464 A | 8/1994 | Friedman et al. |
| 5,363,218 A * | 11/1994 | Hoshino ................... 358/518 |
| 5,398,120 A | 3/1995 | Friedman et al. |
| 5,416,890 A | 5/1995 | Beretta |
| 5,481,655 A | 1/1996 | Jacobs |
| 5,500,921 A | 3/1996 | Ruetz |
| 5,510,910 A | 4/1996 | Bockman et al. |
| 5,515,172 A | 5/1996 | Shiau |
| 5,528,261 A | 6/1996 | Holt et al. |
| 5,537,228 A | 7/1996 | Dillinger |
| 5,574,666 A | 11/1996 | Ruetz et al. |
| 5,583,666 A | 12/1996 | Ellson et al. |
| 5,594,558 A | 1/1997 | Usami et al. |
| 5,596,428 A | 1/1997 | Tytgat et al. |
| 5,611,030 A | 3/1997 | Stokes |
| 5,627,950 A | 5/1997 | Stokes |
| 5,644,509 A | 7/1997 | Schwartz |
| 5,650,942 A * | 7/1997 | Granger ..................... 358/500 |
| 5,689,350 A | 11/1997 | Rolleston |

(List continued on next page.)

Primary Examiner—Mark Wallerson
Assistant Examiner—Michael Burleson
(74) Attorney, Agent, or Firm—Taylor & Aust, P.C.

(57) ABSTRACT

A method of mapping an input color gamut of an input device onto an output color gamut of an output device includes establishing a threshold chroma value in the input color gamut. For first input chroma values below the threshold chroma value, each first input chroma value is mapped onto a respective one of a plurality of first output chroma values such that a first linear relationship exists between the first input chroma values and the first output chroma values. Each corresponding first input lightness value is mapped onto a respective one of a plurality of first output lightness values such that a second linear relationship exists between the first input lightness values and the first output lightness values. For second input chroma values above the threshold chroma value, each second input chroma value is mapped onto a respective one of a plurality of second output chroma values such that a first non-linear relationship exists between the second input chroma values and the second output chroma values. Each corresponding second input lightness value is mapped onto a respective one of a plurality of second output lightness values such that a second non-linear relationship exists between the second input lightness values and the second output lightness values.

16 Claims, 7 Drawing Sheets

U.S. PATENT DOCUMENTS

| | | |
|---|---|---|
| 5,699,491 A | 12/1997 | Barzel |
| 5,710,824 A | 1/1998 | Mongeon |
| 5,731,818 A | 3/1998 | Wan et al. |
| 5,734,802 A | 3/1998 | Maltz et al. |
| 5,754,184 A | 5/1998 | Ring et al. |
| 5,786,908 A | 7/1998 | Liang |
| 5,796,874 A | 8/1998 | Woolfe et al. |
| 5,801,555 A | 9/1998 | Kwon |
| 5,844,699 A | 12/1998 | Usami et al. |
| 6,417,891 B1 * | 7/2002 | Cacciatore et al. .......... 348/649 |
| 6,437,792 B1 * | 8/2002 | Ito et al. ..................... 345/600 |
| 6,583,824 B2 * | 6/2003 | Cacciatore et al. .......... 348/649 |

* cited by examiner

NON-LINEAR METHOD OF MAPPING THE LIGHTNESS AND CHROMA OF A DISPLAY DEVICE GAMUT ONTO A PRINTING DEVICE GAMUT

BACKGROUND OF THE INVENTION

1. Field of the Invention

The present invention relates to a method of gamut mapping, and, more particularly, to a method of mapping a display device gamut onto a printing device gamut.

2. Description of the Related Art

The printing process often involves creating and viewing something on a display device before it is sent to a printing device. Consequently, it is desirable for the printing device output to look similar to the display device output. Since the physics behind the two devices is very different, many of the colors created on the display device cannot be created on the printing device and vice versa. Hence, the non-printable display device colors must be mapped to printable display device colors. Similarly, the mapping makes use of the printable colors that the display device does not use. This mapping process is referred to as "gamut mapping."

Figure 1:
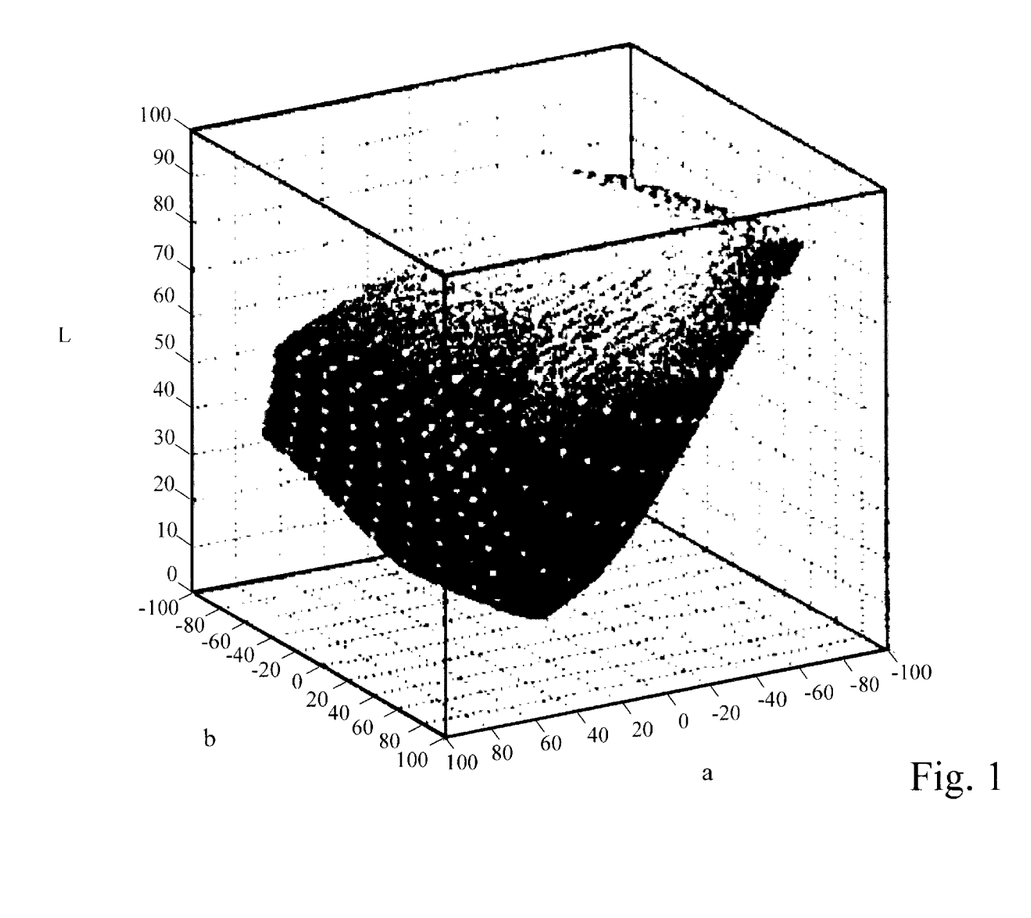
FIG. 1 is a three-dimensional plot of the gamut of a computer monitor.

The gamut of a device is defined as the set of all colors that can be produced by that device. The colors in the gamut are defined by using a three-dimensional device-independent color space such as CIELAB. A gamut is usually represented as a three-dimensional volume in CIELAB space. In CIELAB color space, luminance (lightness), hue (color) and chroma (saturation) are specified by three-dimensional coordinates ($L^*$, $a^*$, $b^*$). CIE stands for Commission Internationale de l'Eclairage, an international body of color scientists. L describes relative lightness; A represents relative redness-greenness, and B represents relative yellowness-blueness. Luminance is specified by the $L^*$ value of the point of interest; hue is specified by the angle that is the arc tan of $b^*/a^*$; and chroma is specified by the distance of the point of interest from the $L^*$ axis, which can be calculated from the formula $[(a^*)^2+(b^*)^2]^{1/2}$. FIG. 1 is a three-dimensional plot of the gamut of a typical computer monitor.

Gamut mapping is a process by which the gamut of one device is mapped onto the gamut of a different device. If the devices are similar, and hence have gamuts of similar shape and size, this process is relatively straightforward and usually consists of a one-to-one or near one-to-one mapping (by clipping the few out-of-gamut colors) from one gamut onto the other. However, when the devices are very different, which is the case for monitors and printers, the gamut mapping process is very problematic.

The gamut of a monitor and the gamut of a printer are very different because of the physics involved with the way the colors are generated. Colors generated on a monitor are made by emitting different intensities of three different colors of light (red, green, and blue). In the case of the printed output of a printer, in contrast, ambient light reflecting off of the printed output creates colors. The ink on the printed output absorbs different amounts of three different colors of light (red, green, and blue), thereby creating different colors. Monitors use what is referred to as "additive color mixing" because they add or emit different intensities of three different colors of light. Printers use what is referred to as "subtractive color mixing" because the ink on the paper subtracts or absorbs different amounts of three different colors of light. Monitors are called RGB devices because they emit red, green, and blue light to make colors. Printers are called CMY devices because they use cyan, magenta, and yellow absorbers (ink) to make colors (cyan absorbs red, magenta absorbs green, and yellow absorbs blue).

Figure 2A:
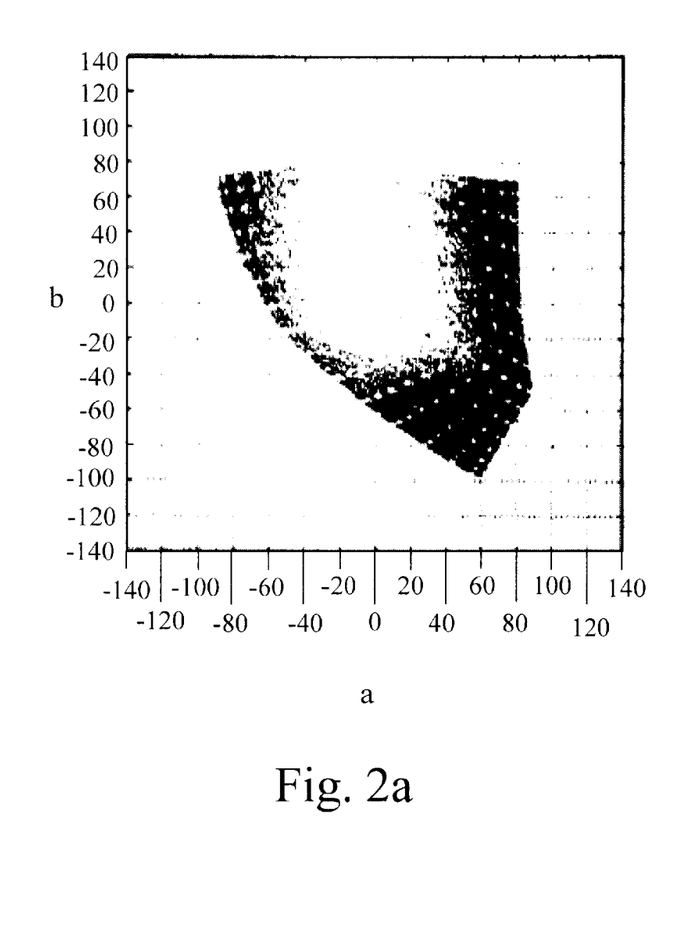
FIG. 2*a* is a projection of a monitor gamut onto the a*b* plane.
Figure 2B:
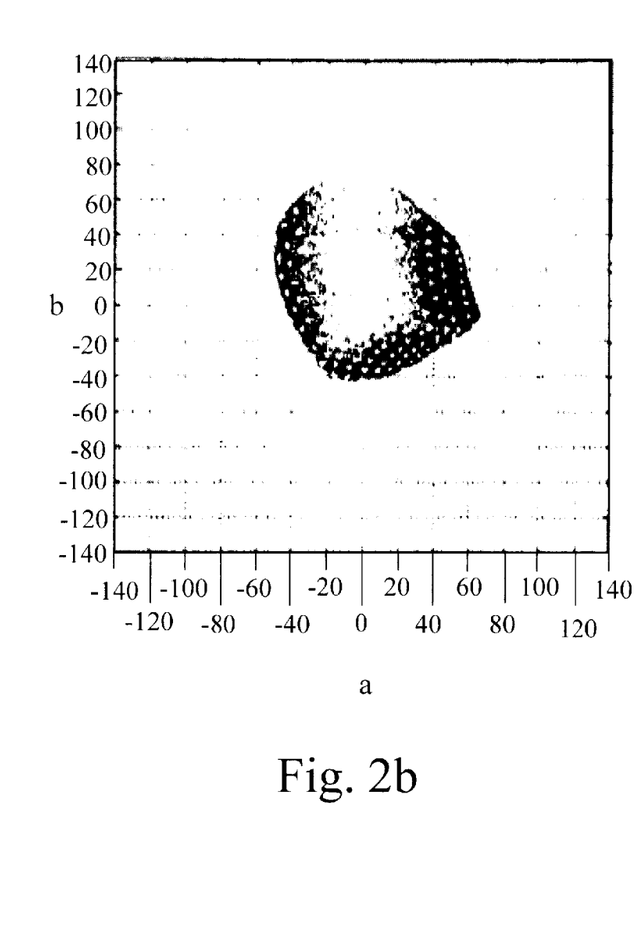
FIG. 2*b* is a projection of a printer gamut onto the a*b* plane.
Figure 3A:
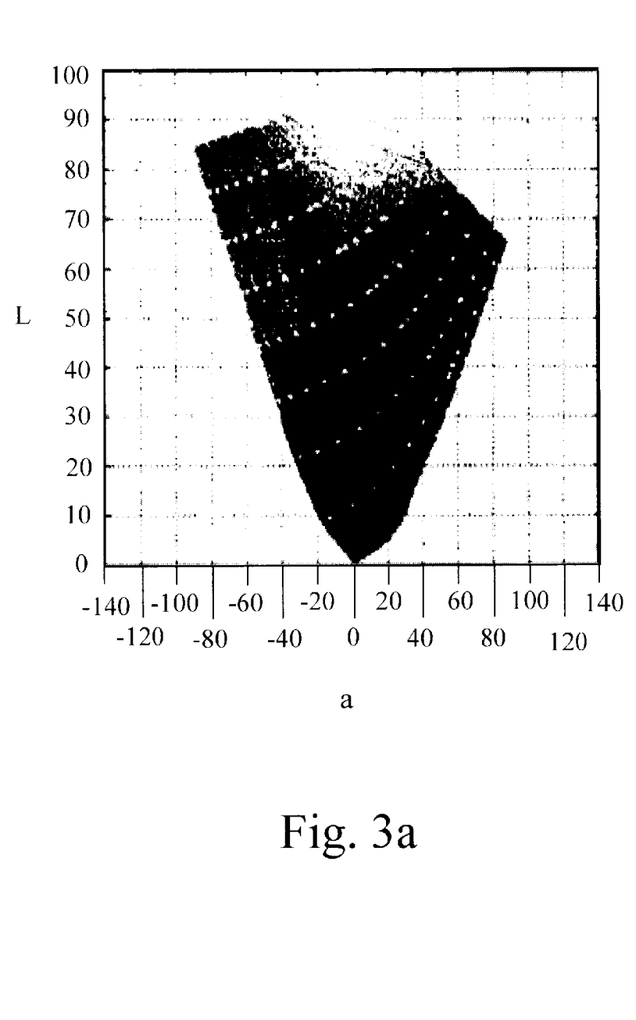
FIG. 3*a* is a projection of a monitor gamut onto the L*a* plane.
Figure 3B:
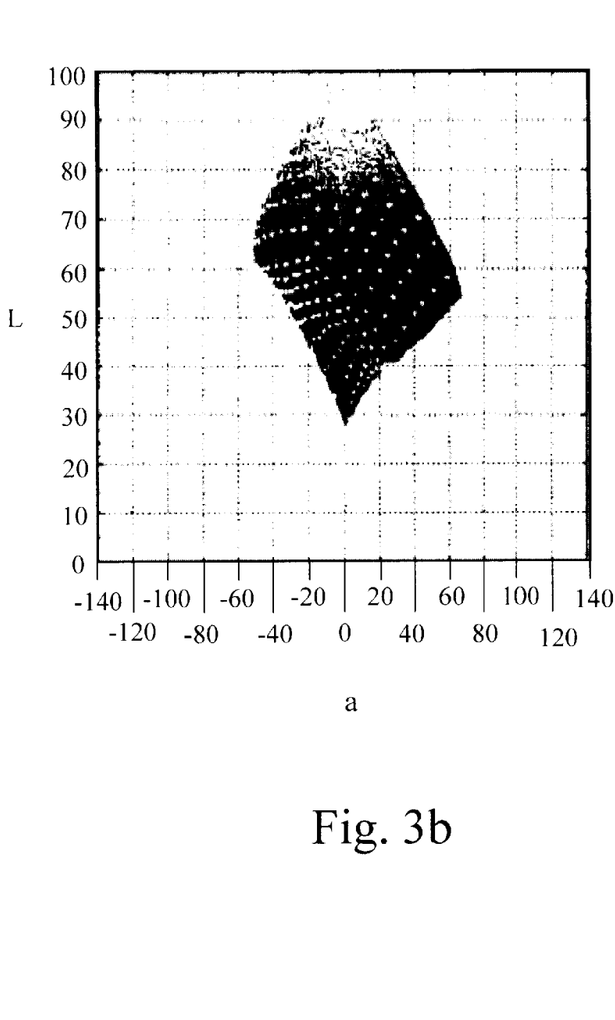
FIG. 3*b* is a projection of a printer gamut onto the L*a* plane.
Figure 4A:
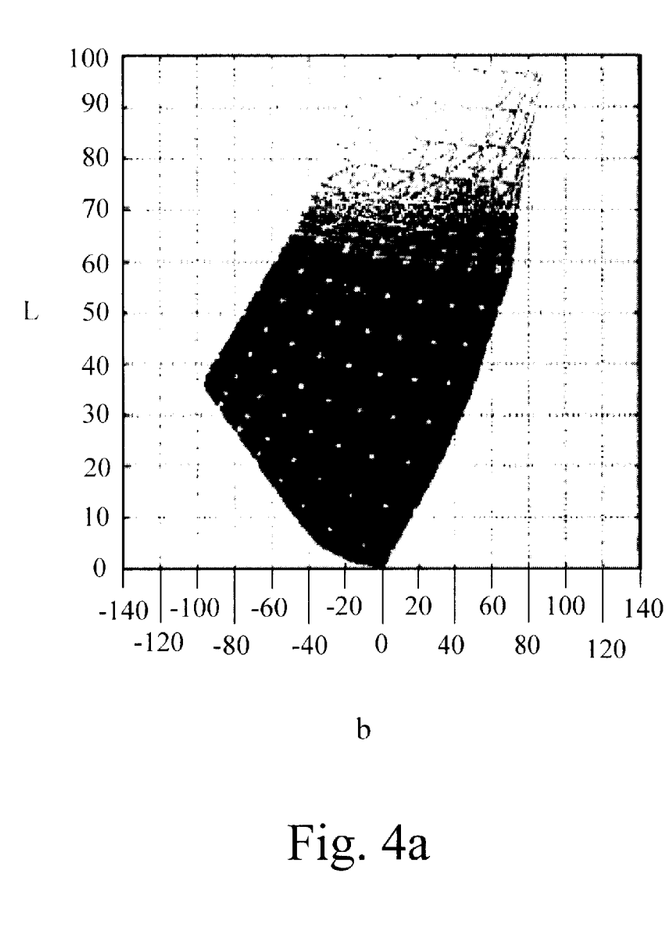
FIG. 4*a* is a projection of a monitor gamut onto the L*b* plane.
Figure 4B:
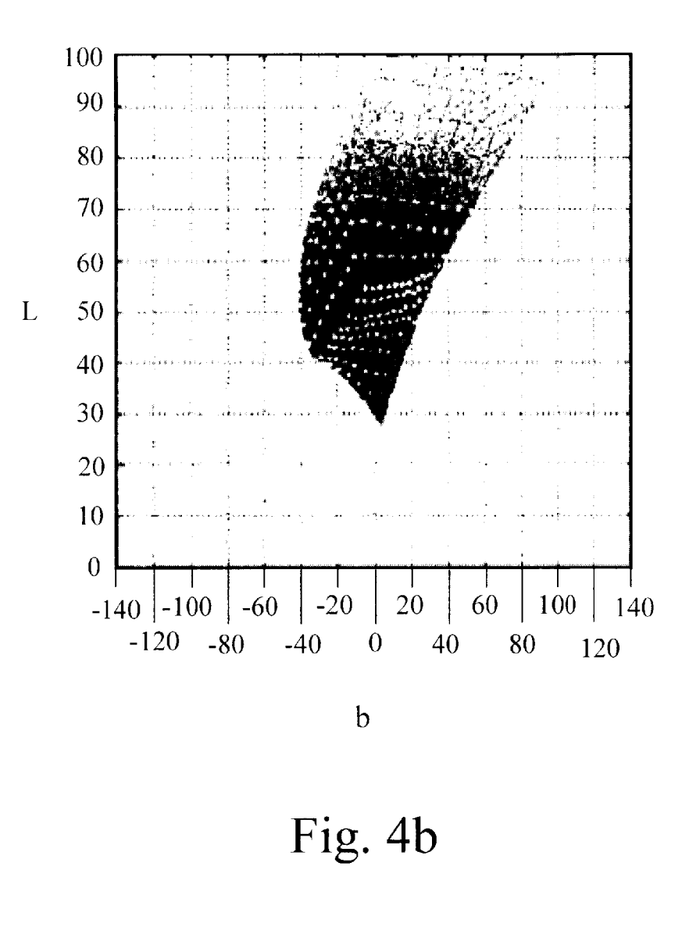
FIG. 4*b* is a projection of a printer gamut onto the L*b* plane.

FIGS. 2a, 2b, 3a, 3b, 4a and 4b illustrate the differences between a monitor gamut and a printer gamut. FIGS. 2a and 2b are projections of a monitor gamut plot and a printer gamut plot, respectively, onto the $a^*b^*$ plane. FIGS. 3a and 3b are projections of a monitor gamut plot and a printer gamut plot, respectively, onto the $L^*a^*$ plane. FIGS. 4a and 4b are projections of a monitor gamut plot and a printer gamut plot, respectively, onto the $L^*b^*$ plane. As can be seen, the gamut of the monitor is more extensive than the gamut of the printer.

In a paper titled "Gamut Mapping Algorithms Based On Psychophysical Experiment" (Proceedings of the 5th Color Imaging Conference, pp. 44–49) by Morovic and Luo, five gamut-mapping processes are evaluated via a psychophysical experiment. The five processes were reviewed and were found to have moderate to poor results. The main problem with these gamut-mapping processes is that they modify hue and lightness too great an amount. Changing the hue by any amount, or changing the lightness by too great an amount, destroys the similarity between the printer output and the display on the monitor.

Figure 5:
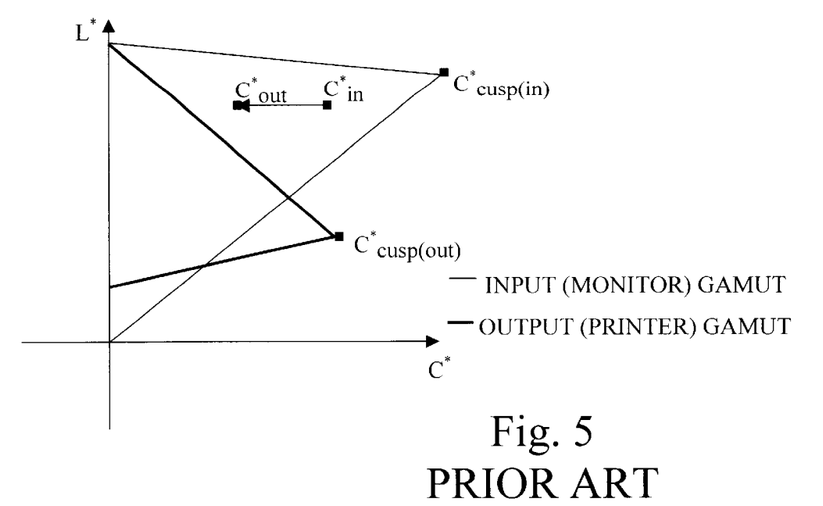
FIG. 5 is a plot of a first step of a known method of mapping a monitor gamut onto a printer gamut.
Figure 6:
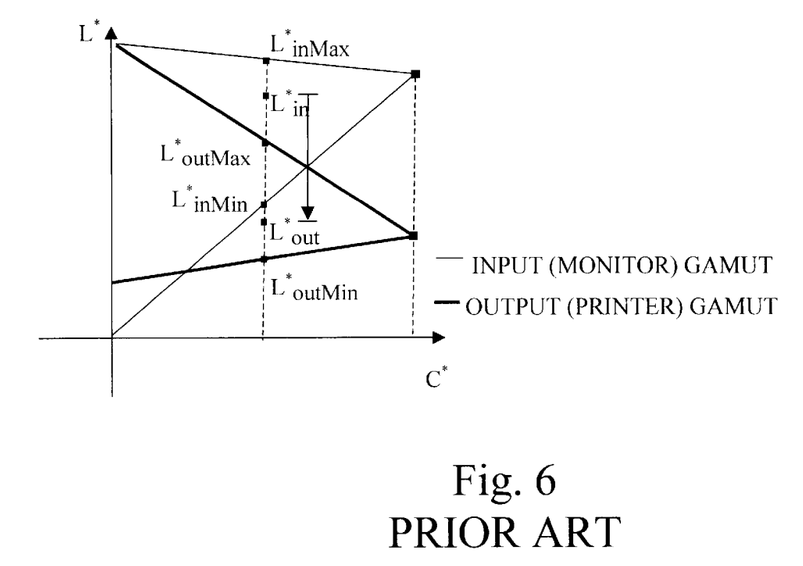
FIG. 6 is a plot of a second step of the known method of FIG. 5.

Morovic and Luo describe a gamut mapping method called "Linear Chroma Mapping and Lightness Range Mapping (CLLIN)". This method depends on first determining the cusps of the two different gamuts. The cusp of a gamut is defined as the boundary of the gamut in the $a^*b^*$ projection and is generally taken to be the edges of the RGB color cube that go from red to yellow to green to cyan to blue to magenta and back to red in CIELAB space. Once the printer gamut cusp and the monitor gamut cusp have been determined, then at a given hue the chroma of the monitor is scaled using the following equation (1):

$$C^*_{out}=C^*_{in}(C^*_{cusp(out)}/C^*_{cusp(in)})$$

wherein $C^*_{in}$ is the input monitor chroma, $C^*_{cusp(out)}$ is the maximum value of the chroma of the printer cusp over the entire range of $L^*$ values, $C^*_{cusp(in)}$ is the maximum value of the chroma of the monitor cusp over the entire range of $L^*$ values, and $C^*_{out}$ is the remapped chroma (see FIG. 5). Next, lightness is mapped using the following equation (2):

$$L^*_{out}=L^*_{outMin}+(L^*_{in}-L^*_{inMin})[(L^*_{outMax}-L^*_{outMin})/(L^*_{inMax}-L^*_{inMin})]$$

wherein $L^*_{in}$ is the input monitor lightness, $L^*_{out}$ is the remapped lightness (see FIG. 6), $L^*_{outMin}$ is the minimum lightness of the printer at $C^*_{out}$, $L^*_{inMin}$ is the minimum lightness of the monitor at $C^*_{out}$, $L^*_{outMax}$ is a maximum lightness of the printer at $C^*_{out}$, and $L^*_{inMax}$, is a maximum lightness of the monitor at $C^*_{out}$.

The CLLIN gamut mapping method described in Morovic and Luo consists of two linear mapping steps and has some good attributes. The biggest problem with this method is that it tends to make the printer output too dark. This is because of the fact that the cusp of the printer gamut is much darker than the cusp of the monitor gamut.

What is needed in the art is a method of mapping a display device gamut onto a printing device gamut which does not result in a printer output that is too dark.

SUMMARY OF THE INVENTION

The present invention provides a non-linear gamut mapping process which preserves hue completely, preserves lightness for all but the more saturated or more chromatic colors, and performs most of the gamut mapping by changing chroma.

The invention comprises, in one form thereof, a method of mapping an input color gamut of an input device onto an output color gamut of an output device. A threshold chroma value in the input color gamut is established. For first input chroma values below the threshold chroma value, each first input chroma value is mapped onto a respective one of a plurality of first output chroma values such that a first linear relationship exists between the first input chroma values and the first output chroma values. Each corresponding first input lightness value is mapped onto a respective one of a plurality of first output lightness values such that a second linear relationship exists between the first input lightness values and the first output lightness values. For second input chroma values above the threshold chroma value, each second input chroma value is mapped onto a respective one of a plurality of second output chroma values such that a first non-linear relationship exists between the second input chroma values and the second output chroma values. Each corresponding second input lightness value is mapped onto a respective one of a plurality of second output lightness values such that a second non-linear relationship exists between the second input lightness values and the second output lightness values.

An advantage of the present invention is that the output of the printer is not too dark.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 7:
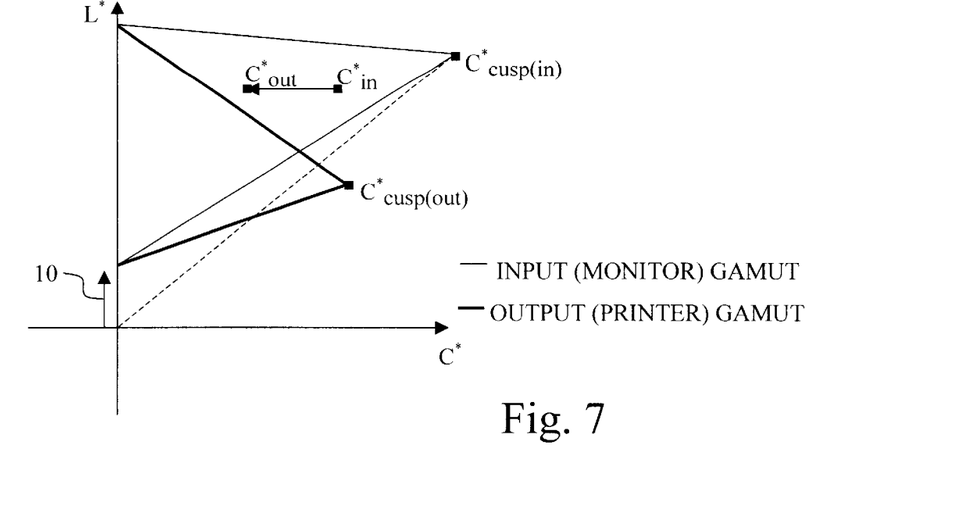
FIG. 7 is a plot of a first step of one embodiment of the method of the present invention.
Figure 8:
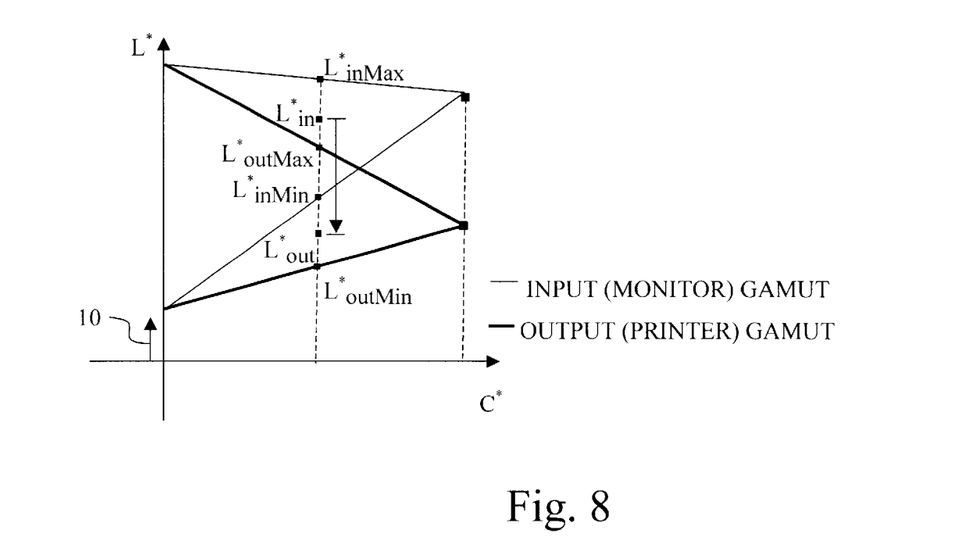
FIG. 8 is a plot of a second step of the method of FIG. 7.

The present invention is a method of non-linear gamut mapping that performs most of the mapping on the most chromatic colors. A minimum chroma threshold value ($C^*_{min}$) is defined, and input chromas below $C^*_{min}$ are not remapped. The first step is to linearly scale the input (monitor) gamut in lightness so that the white point of the monitor maps to the white point of the printer and likewise for the black point. This first step results in the effect indicated by arrow 10 in FIGS. 7 and 8, wherein the lower boundary of the printer gamut intersects the L* axis at the same point as the lower boundary of the monitor gamut, and the upper boundary of the printer gamut intersects the L* axis at the same point as the upper boundary of the monitor gamut. The next step is to map the chroma using the following equation (3):

$$C^*_{out} = C^*_{in}, C^*_{in} \leq C^*_{min}$$

and $$C^*_{out} = C^*_{in} + (C^*_{cusp(out)} - C^*_{in})\left(\frac{C^*_{in} - C^*_{min}}{C^*_{cusp(in)} - C^*_{min}}\right)^p, C^*_{in} > C^*_{min}$$

wherein $C^*_{min}$ is the chroma threshold, and p is a user-selectable power that controls the strength of the mapping for the less chromatic colors. The greater p is the more the mapping is pushed out to the most chromatic colors. Lightness is then mapped using two equations (4) and (5). Equation (4) is the same as equation (2) and is given as follows:

$$L^*_{CLLIN} = L^*_{outMin} + (L^*_{in} - L^*_{inMin})\left(\frac{L^*_{outMax} - L^*_{outMin}}{L^*_{inMax} - L^*_{inMin}}\right)$$

wherein $L^*_{CLLIN}$ is an intermediate lightness. Equation (5) uses the result of equation (4) to perform the lightness mapping and is given as follows:

$$L^*_{out} = L^*_{in}, C^*_{in} \leq C^*_{min}$$

and $$L^*_{out} = L^*_{in} + (L^*_{CLLIN} - L^*_{in})\left(\frac{C^*_{in} - C^*_{min}}{C^*_{cusp(in)} - C^*_{min}}\right)^q, C^*_{in} > C^*_{min}$$

wherein q is another user-selectable power that controls the strength of the mapping for the less chromatic colors. Although p (the exponent in Equation (3)) and q (the exponent in Equation (4)) may be equal, they may also be different so that the chroma mapping and the lightness mapping may be controlled separately.

The gamut mapping method of the present invention has most of the good attributes of the CLLIN method, but has enough flexibility to solve the problem of the CLLIN output being too dark. This method does not provide an exact mapping because equation (5) may leave some colors out of the printer gamut. As a final step in the method, any colors that are out of the gamut are clipped, while hue is preserved. That is, if the mapping results in any color that is outside of the printer gamut, that color is remapped to a nearby point on the printer gamut. More particularly, the color can be remapped to the point on the printer gamut that has the same L* value as the color, i.e., shift the color left horizontally in FIG. 8 until the printer gamut is reached. Alternatively, the color can be remapped to the closer of two points on the printer gamut that have the same C* value as the color. Another option is to remap the color to the closest point on the printer gamut, regardless of that point's L* value and C* value.

Figure 9:
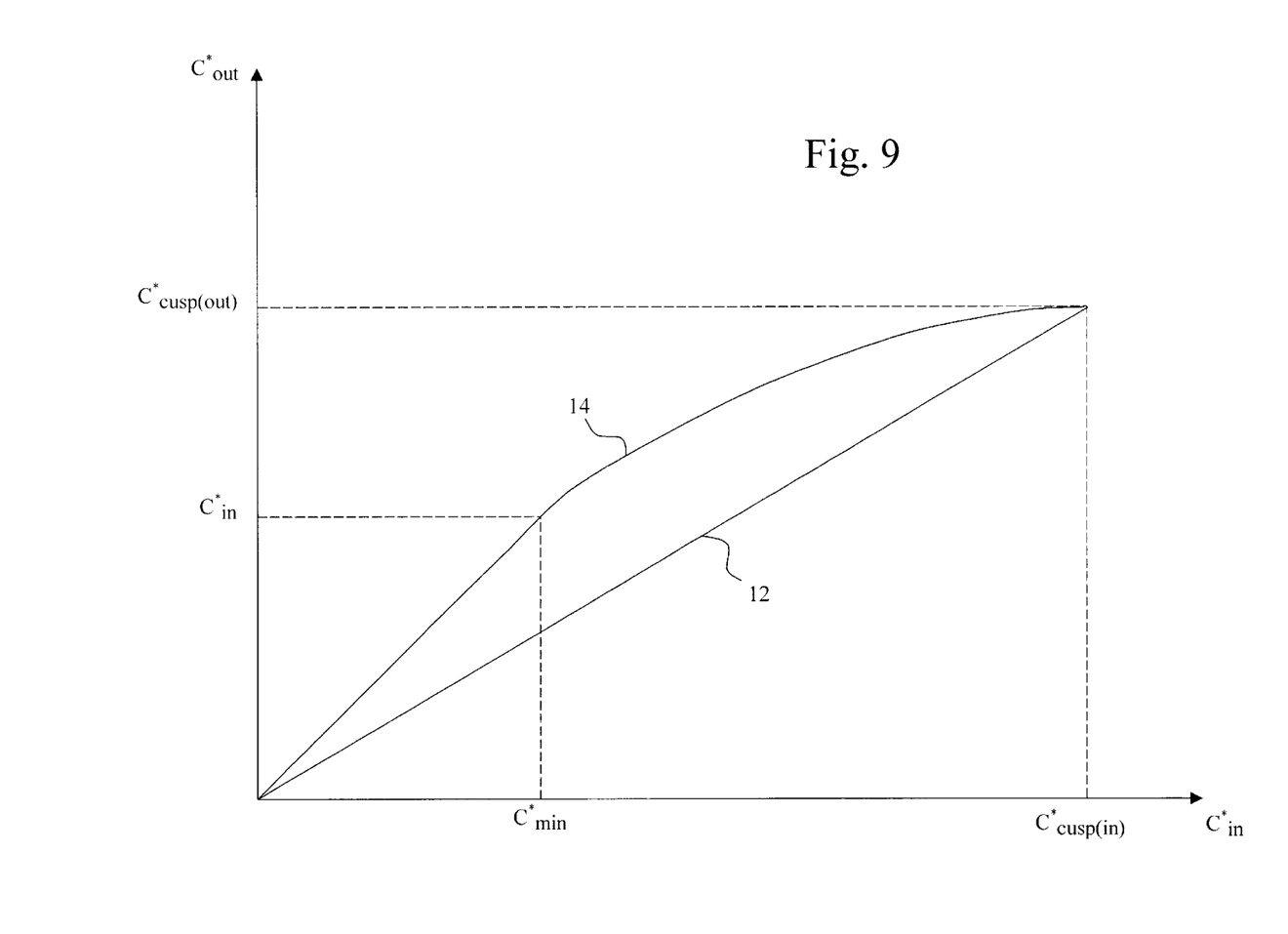
FIG. 9 is a plot of the printer chroma versus the monitor chroma in the known method of FIGS. 5 and 6 and in the method of FIGS. 7 and 8.

FIG. 9 provides a plot 12 of $C^*_{in}$ versus $C^*_{out}$ according to the known method of equation (1), as well as a plot 14 of $C^*_{in}$ versus $C^*_{out}$ according to the method of the present invention. As can be seen, plot 12 is linear throughout the range of $C^*_{in}$. As is also evident from both plot 12 and equation (1), $C^*_{out}$ is always less than $C^*_{in}$ since, as can be seen in FIG. 5, $C^*_{(cusp)out}$ is less than $C^*_{(cusp)in}$. This proportional reduction in chroma is one reason that printer output resulting from the known method of Morovic and Luo appears too dark. Plot 14 is also linear in the range where $C^*_{in}$ is less than $C^*_{min}$. However, there is no proportional reduction in chroma within this range. That is, $C^*_{out}$= $C^*_{in}$, resulting in no darkening of the printer output.

In the range wherein $C^*_{in}$ is between $C^*_{min}$ and $C^*_{(cusp)in}$, the plot 14 of $C^*_{out}$ varies nonlinearly with $C^*_{in}$. The transition between the linear range, i.e., at and below $C^*_{min}$, and the non-linear range, i.e., above $C^*_{min}$, is continuous and smooth. In this non-linear range, $C^*_{out}$ is greater than it would be in the known method of Morovic and Luo, as is evident from a comparison of plots 12 and 14. Thus, in this non-linear range too, the printer output does not appear too dark. As $C^*_{in}$ approaches $C^*_{(cusp)in}$, $C^*_{out}$ asymptotically approaches $C^*_{(cusp)out}$, thereby preventing $C^*_{out}$ from exceeding $C^*_{(cusp)out}$.

In the embodiment shown herein, the mapping is performed using equations whose outputs may be calculated using a microcontroller. However, it is to be understood that the mapping may also be performed using a look up table that approximates the values that are obtainable by the equations.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of mapping an input color gamut of an input device onto an output color gamut of an output device, comprising the steps of:
  establishing a threshold chroma value in the input color gamut;
  for first input chroma values below said threshold chroma value:
    mapping each said first input chroma value onto a respective one of a plurality of first output chroma values such that a first linear relationship exists between said first input chroma values and said first output chroma values; and
    mapping each corresponding first input lightness value onto a respective one of a plurality of first output lightness values such that a second linear relationship exists between said first input lightness values and said first output lightness values; and
  for second input chroma values above said threshold chroma value:
    mapping each said second input chroma value onto a respective one of a plurality of second output chroma values such that a first non-linear relationship exists between said second input chroma values and said second output chroma values; and
    mapping each corresponding second input lightness value onto a respective one of a plurality of second output lightness values such that a second non-linear relationship exists between said second input lightness values and said second output lightness values.

2. The method of claim 1, wherein said mapping steps produce a plurality of color values, each said color value including a selected one of said output chroma values and a corresponding one of said output lightness values, said method comprising the further steps of:
  identifying selected ones of said color values that are outside of said output color gamut; and
  remapping at least one of said selected color values that is outside of said output color gamut onto a respective point on said output color gamut.

3. The method of claim 2, wherein said respective point on said output color gamut comprises a closer one of two points on said output color gamut having a same chroma value as said one selected color value that is outside of said output color gamut.

4. The method of claim 2, wherein said respective point on said output color gamut comprises a point on said output color gamut having a same lightness value as said one selected color value that is outside of said output color gamut.

5. The method of claim 2, wherein said respective point on said output color gamut comprises a point on said output color gamut that is closest to said one selected color value that is outside of said output color gamut.

6. The method of claim 1, wherein said first non-linear relationship comprises an exponential function of said second input chroma values.

7. The method of claim 1, wherein said second non-linear relationship comprises an exponential function of said second input chroma values.

8. The method of claim 1, wherein the input device comprises a monitor, the output device comprising a printer.

9. The method of claim 8, wherein a maximum chroma value of the input color gamut is greater than a maximum chroma value of the output color gamut.

10. The method of claim 9, wherein said maximum chroma value of said input color gamut is mapped onto said maximum chroma value of said output color gamut.

11. The method of claim 8, wherein each said second input chroma value is one of equal to and greater than said respective one of said second output chroma values.

12. The method of claim 1, wherein each said first input chroma value is equal to said respective one of said first output chroma values.

13. The method of claim 1, wherein said first linear relationship and said first non-linear relationship are characterized by the respective equations:

$$C^*_{out} = C^*_{in}, C^*_{in} \leq C^*_{min}$$

and $$C^*_{out} = C^*_{in} + (C^*_{cusp(out)} - C^*_{in})\left(\frac{C^*_{in} - C^*_{min}}{C^*_{cusp(in)} - C^*_{min}}\right)^p, C^*_{in} > C^*_{min}$$

wherein p is a user-selectable value, $C^*_{in}$ is one of said first input chroma value and said second input chroma value, $C^*_{min}$ is said threshold chroma value, $C^*_{cusp(out)}$ is a maximum chroma value of said output color gamut, $C^*_{cusp(in)}$ is a maximum chroma value of said input color gamut, and $C^*_{out}$ is one of said first output chroma value and said second output chroma value.

14. The method of claim 1, wherein said second linear relationship and said second non-linear relationship are characterized by the respective equations:

$$L^*_{out} = L^*_{in}, C^*_{in} \leq C^*_{min}$$

and $$L^*_{out} = L^*_{in} + (L^*_{CLLIN} - L^*_{in})\left(\frac{C^*_{in} - C^*_{min}}{C^*_{cusp(in)} - C^*_{min}}\right)^q, C^*_{in} > C^*_{min}$$

wherein $$L^*_{CLLIN} = L^*_{outMin} + (L^*_{in} - L^*_{inMin})\left(\frac{L^*_{outMax} - L^*_{outMin}}{L^*_{inMax} - L^*_{inMin}}\right)$$

and wherein q is a user-selectable value, $C^*_{in}$ is one of said first input chroma value and said second input chroma value, $C^*_{min}$ is said threshold chroma value, $C^*_{cusp(in)}$ is a maximum chroma value of said input color gamut, $L^*_{in}$ is one of said first input lightness value and said second input lightness value, $L^*_{out}$ is one of said first output lightness value and said second output lightness value, $L^*_{outMin}$ is a minimum lightness of the output color gamut at $C^*_{out}$, $L^*_{inMin}$ is a minimum lightness of the input color gamut at $C^*_{out}$, $L^*_{outMax}$ is a maximum lightness of the output color gamut at $C^*_{out}$, and $L^*_{inMax}$ is a maximum lightness of the input color gamut at $C^*_{out}$.

15. A method of mapping an input color gamut of an input device onto an output color gamut of an output device, comprising the steps of:

establishing a threshold chroma value in the input color gamut;

for first input chroma values below said threshold chroma value, mapping each said first input chroma value onto a respective one of a plurality of first output chroma values such that a linear relationship exists between said first input chroma values and said first output chroma values; and for second input chroma values above said threshold chroma value, mapping each said second input chroma value onto a respective one of a plurality of second output chroma values such that a non-linear relationship exists between said second input chroma values and said second output chroma values.

16. A method of mapping an input color gamut of an input device onto an output color gamut of an output device, comprising the steps of:

establishing a threshold chroma value in the input color gamut;

for first input chroma values below said threshold chroma value, mapping each corresponding first input lightness value onto a respective one of a plurality of first output lightness values such that a linear relationship exists between said first input lightness values and said first output lightness values; and for second input chroma values above said threshold chroma value, mapping each corresponding second input lightness value onto a respective one of a plurality of second output lightness values such that a non-linear relationship exists between said second input lightness values and said second output lightness values.

* * * * *